(12) United States Patent
Pomerantz et al.

(10) Patent No.: US 8,956,173 B2
(45) Date of Patent: Feb. 17, 2015

(54) SECURING ACCESS OF REMOVABLE MEDIA DEVICES

(71) Applicant: Sandisk Technologies Inc., Plano, TX (US)

(72) Inventors: Itzhak Pomerantz, Kfar Saba (IL); Rahav Yairi, Oranit (IL)

(73) Assignee: Sandisk Technologies Inc., Plano, TX (US)

( * ) Notice: Subject to any disclaimer, the term of this patent is extended or adjusted under 35 U.S.C. 154(b) by 77 days.

(21) Appl. No.: 13/654,302

(22) Filed: Oct. 17, 2012

(65) Prior Publication Data

US 2014/0109181 A1    Apr. 17, 2014

(51) Int. Cl.
*H01R 13/62* (2006.01)

(52) U.S. Cl.
USPC .......................... 439/347; 439/638; 439/660

(58) Field of Classification Search
USPC .................. 439/347, 638, 660; 711/115, 154
See application file for complete search history.

(56) References Cited

U.S. PATENT DOCUMENTS

| | | | |
|---|---|---|---|
| 5,695,365 A * | 12/1997 | Kennedy et al. ............. | 439/638 |
| 6,893,242 B2 * | 5/2005 | Yang et al. .................... | 418/216 |
| 7,014,490 B1 | 3/2006 | Morikawa et al. | |
| 7,025,636 B2 * | 4/2006 | Allen ............................ | 439/638 |
| 7,160,137 B1 | 1/2007 | Yeh | |
| 7,390,201 B1 | 6/2008 | Quinby et al. | |
| 7,448,915 B2 * | 11/2008 | Chou ............................ | 439/638 |
| 7,465,181 B1 | 12/2008 | Bridges et al. | |
| 7,578,691 B2 * | 8/2009 | Weksler et al. ............... | 439/347 |
| 7,689,231 B2 | 3/2010 | Mardiks et al. | |
| 7,722,369 B2 | 5/2010 | Bushby | |
| 7,901,250 B2 * | 3/2011 | Lam et al. ..................... | 439/638 |
| 7,938,863 B2 | 5/2011 | Skinner et al. | |
| 8,092,241 B2 * | 1/2012 | Chang .......................... | 439/305 |
| 8,529,283 B1 * | 9/2013 | Carden ......................... | 439/347 |
| 2005/0009404 A1 * | 1/2005 | Lee ............................... | 439/638 |
| 2008/0028146 A1 | 1/2008 | Dan et al. | |
| 2009/0113093 A1 * | 4/2009 | Chen ............................. | 710/74 |
| 2011/0003495 A1 * | 1/2011 | Kuo .............................. | 439/155 |
| 2011/0008986 A1 * | 1/2011 | Thom et al. .................. | 439/347 |
| 2012/0244737 A1 * | 9/2012 | Becavin et al. ............... | 439/347 |
| 2013/0179610 A1 * | 7/2013 | Smurthwaite et al. ........ | 710/63 |

OTHER PUBLICATIONS

"Computer System Security Updates," Rockwell Automation, www.rockwellautomation.com, Oct. 2009, 11 pages.
IEEE Standard for Authentication in Host Attachments of Transient Storage Devices, IEEE Standard 1667-2009, IEEE Computer Society, Mar. 26, 2010, 127 pages.
USB Disabler Pro, IntelliAdmin, http://www.intelliadmin.com/index.php/usb-disabler-pro, printed Oct. 17, 2012, 3 pages.

* cited by examiner

*Primary Examiner* — Gary Paumen
(74) *Attorney, Agent, or Firm* — Toler Law Group, PC

(57) ABSTRACT

A security adapter for an electronic device comprises a body, a device connector and host connectors that include a male connector and a female connector and an interlocking structure. The host connector is capable of engaging with a host, and the device connector is capable of engaging with an electronic device. In a first position, the interlocking structure is configured to lock an unlocked engagement of the interlocking structure to the device connector, and in a second position, the interlocking structure is configured to unlock a locked engagement of the interlocking structure to the device connector. Electronic circuitry of the security adapter is operable to identify the security adapter to the host. The electronic circuitry communicates with an access control application running on the host for controlling data access operations between the host and a device that is connectable to the security adapter.

23 Claims, 4 Drawing Sheets

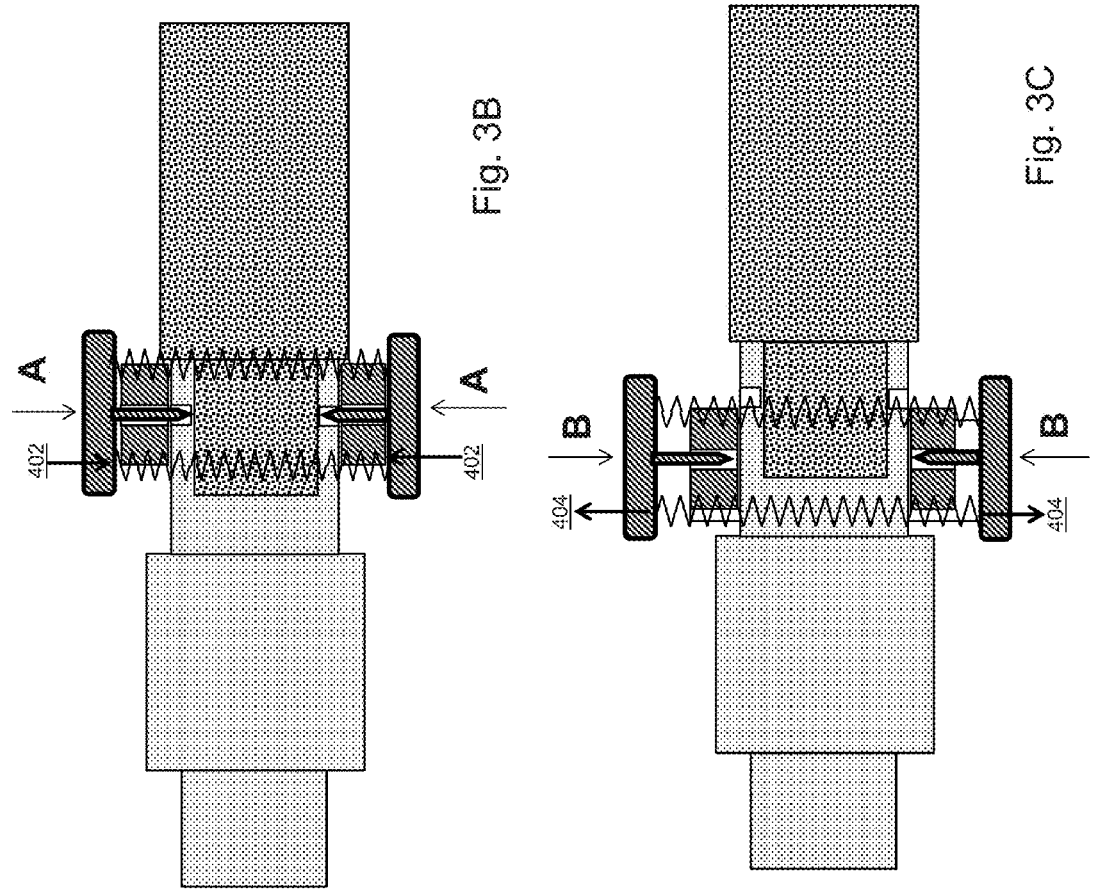

SECURING ACCESS OF REMOVABLE MEDIA DEVICES

BACKGROUND

USB flash drives (UFDs) are well known portable removable electronic devices in the art of computer engineering for storing and porting digital information from one host computer to another. However, unauthorized and unmonitored use of UFDs and other such electronic devices pose many security risks to military installations, business enterprises, educational institutes and other such organizations. Their small size, high capacity and ubiquity make them an easy vehicle for unlawful transfer of data to and from the organization network.

Organizations choose to deal with such scenario in different ways. For example, some organizations provide guest users a specific Enterprise USB drive embedded with a special security software application. Other organizations completely ban users from using USB drives and other removable media devices within their organization networks. However, such approaches may be too restrictive and hard to enforce.

Hence there is a need to provide a more creative and innovative ways that will ensure that information systems remain secure, but yet allow users to transfer data to and from such systems freely and easily when authorized to do so.

SUMMARY

Embodiments of the present invention are defined by the claims which should be accorded the widest scope and not limited by anything in this section. As a brief introduction, embodiments described in this document and illustrated in the attached drawings generally relate to a security adapter for an electronic device that, when mounted to a host configured to facilitate device identification, may be utilized to implement device-host authentication and controlled data and user access. In a typical implementation, the security adapter includes a body and two connectors that include a male connector and a female connector, wherein the male connector is at least capable of engaging with a host and the female connector is configured to be at least capable of engaging with an electronic device. The security adapter also includes an interlocking structure that is associated with the female connector and configured to have first and second positions. In the first position, the interlocking structure is configured to lock an unlocked engagement of the interlocking structure to the female connector. In the second position, the interlocking structure is configured to unlock a locked engagement of the interlocking structure to the female connector.

The security adapter further includes an electronic circuitry operative to identify the security adapter to the host. With the electronic device and the host operatively coupled via the security adapter as such, the electronic circuitry identifies the security adapter to the host typically for securing user and data access between the electronic device and the host.

Various embodiments described herein represent such security adapter that when mounted to a host is configured to communicate with an access control application running on the host for facilitating authentication with the host. In an embodiment, with the electronic device and the host operatively coupled via the security adapter, the electronic circuitry identifies the security adapter to the host for securing user and data access between the electronic device and the host. The access control application may reside on the host and may be executed directly from the host or may be loaded onto the host, for example from a server over a networked system environment, for running on the host.

Communication between the access control application running on the host and the electronic circuitry of the security adapter is for allowing the access control application to identify the security adapter to the host. Once identified, the access control application provides for controlled data storage and transfer operations between the host and an electronic device, such as a UFD (universal flash drive), that is connectable onto the security adapter.

Such controlled user and data operations may involve controlling (e.g. restricting, conditioning, monitoring) login operations, data storage (e.g. read and write) operations and data access and data transfer in and out of the host directly, among other user and data operations that are commenced between the host and the security adapter.

More specifically, the access control application interacts with the electronic circuitry of the security adapter for analyzing the type of command and required operation coming in from the connectable electronic device, via the security adapter. Once an operation, say a login operation or a data access operation, is analyzed with respect to data residing on the host and/or the electronic device, the required operation is handled by the access control application accordingly.

The access control application may carry out a variety of response mechanisms for controlling user and data operations between the host and the electronic device, via the security adapter. This may include denying access of the electronic device to the host; restricting the electronic device access to certain types of data and/or data locations on the host, for example for reading or writing only certain types of files; or allowing the electronic device access to data residing on the host, or to certain portions thereof. Such as, for example, to deny the electronic device access to secure data (e.g. legal documents, human resource documents) residing on the host.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description serve to explain its principles. Wherever convenient, the same reference numbers will be used throughout the drawings to refer to the same or like elements.

FIG. 3B is a cross-sectional view of the security adapter engaged with an electrical device, according to one embodiment; and FIG. 3C is a cross-sectional view of the security adapter engaged with an electronic device, according to another embodiment.

DETAILED DESCRIPTION

Figure 1:
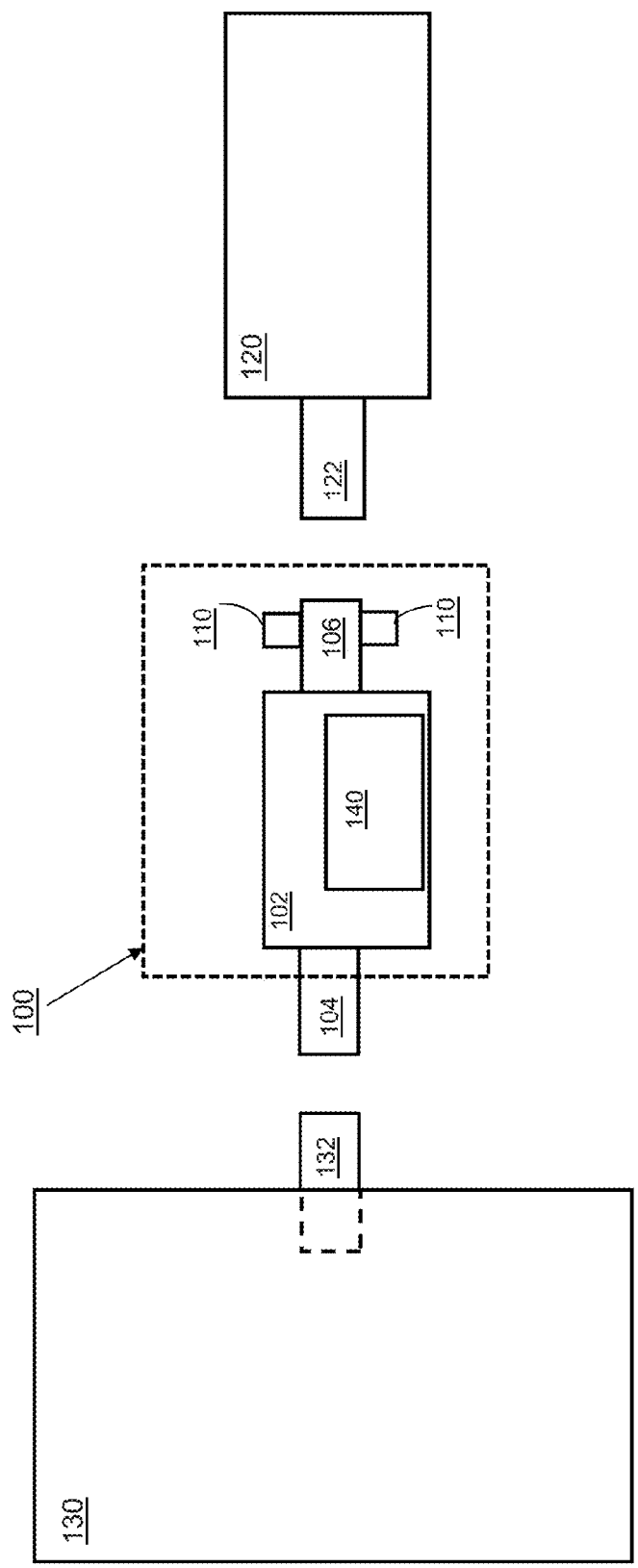
FIG. 1 illustrates one system with a security adapter for engaging with an electronic device and a host in which the invention is embodied.

Various modifications to and equivalents of the embodiments described and shown are possible and various generic principles defined herein may be applied to these and other embodiments. Thus, the claimed invention is to be accorded the widest scope consistent with the principles, features and teachings disclosed herein.

The disclosed embodiments described here are based, in part, on the observation that unauthorized and unmonitored use of UFDs and other such removable electronic devices pose many security risks, among other issues, to computer systems of military installations, business enterprises, educational institutes and other such organizations. In an exemplary use case scenario, unauthorized and unmonitored use of an electronic device with a computer system of an academic institution, for example, may lead to unauthorized use (e.g. accessing files) of the electronic device, such as for the purpose of reading unauthorized information during a university examination.

Some security risks may result from intentional or unintentional use of restricted files, such as confidential information and copyrighted information. In one instance, unauthorized use may include copying from the organization's computer system to a connectable electronic device. In another instance, such use may include installing unauthorized content in the computer system or introducing malicious data and other malware to the computer system. Further to this, when a connectable storage device, such as in form of a UFD device, is inserted to any of the PCs in an organization there is no way to identify and authenticate the owner of the UFD device.

Hence, in order to ensure that computer systems remain secure and are accessed properly there is a need to provide a way to control data access, including data storage and data transfer, to and from such systems and the connectable electronic devices.

One embodiment of this disclosure provides a security adapter for an electronic device, such as a UFD (USB flash drive). The security adapter is typically attached to the electronic device prior to mounting the electronic device into a host for securing user and data access to and from the electronic device; namely, between the electronic device and the host, via the security adapter. The security adapter comprises a body, two connectors that include a female connector and a male connector, typically one on each side of the body, and an interlocking structure. The interlocking structure is with the female connector and configured to have first and second positions, so that in the first position the interlocking structure is configured to lock an unlocked engagement of the interlocking structure to the female connector, and in the second position the interlocking structure unlocks a locked engagement of the interlocking structure to the female connector.

When the male connector is mounted to the host, an electronic circuitry of the security adapter is operative to identify the security adapter to the host. With the electronic device and the host operatively coupled via the security adapter as such, the electronic circuitry identifies the security adapter to the host for controlling user and data access operations between the electronic device and the host.

FIG. 1 illustrates one system with a security adapter 100 for connecting between an electronic device and a host. Security adapter 100 includes a body 102 with two connectors that include a female connector and a male connector, wherein the female connector is capable of engaging with a device connector 122 of an electronic device 120 and the male connector is for mounting to a host 130, such as a desktop computer, via a host connector 132. In general, the body 102 of the security adapter 100 can be designed in any shape suitable to allow two connectors and to allow engaging an electronic device and a host to it via the respective connectors. Electronic device 120 is typically configured in the form of a mass storage medium, such as a USB flash drive, typically based on a non-volatile flash-based memory technology. Moreover, the two connectors are Universal Serial Bus ("USB") connectors that conform to the USB protocol and the electronic device 120 is a USB mass storage drive designed for connecting to a host. USB is a serial bus standard designed to allow peripherals to be connected to host computers using a single standardized interface socket.

In an embodiment, the security adapter 100 is configured with two connectors that include a male connector (plug connector 104) and a female connector (socket connector 106), one on each side of the body 102, in such a way that the male connector; namely, plug connector 104, is at least capable of engaging with the host 130 and the female connector; namely, socket connector 106, is at least capable of engaging with the electronic device 120. It should be noted, however, that the language "one on each side of the body" does not necessarily mean that the body 102 is so restricted in its configuration, in that, e.g., the body must have two sides or, if the body does have two sides that these sides are opposite each other, parallel to each other, located in any other configuration relative to each other, or restricted in any other way.

As shown in FIG. 1, an interlocking structure 110 is associated with the female connector; namely, socket connector 106, and configured to provide any combination of mechanical and device control functions to interlock with or upon the socket connector 106. More specifically, interlocking structure 110 is configured to have first and second positions. In the first position, the interlocking structure 110 is configured to lock an unlocked engagement of the interlocking structure 110 to the socket connector 106. The interlocking structure 110 may be operable in the first position, for example, upon mounting the security adapter 100 to the electronic device 120. This is typically applied for locking the socket connector 106 to the electronic device 120.

In the second position, the interlocking structure 110 is capable of unlocking a locked engagement of the interlocking structure 110 to the socket connector 106 to which it is engaged with. In this second position, with the interlocking structure 110 unlocking the locked engagement of the interlocking structure 110 with the socket connector 106, the interlocking structure 110 may be movable, or slidable about the socket connector 106.

In a typical implementation, the interlocking structure 110 is operative to transition from the first position to the second position conditioned upon external means, such as in the form of a removable structure, which means are of, or are associated with an authorized entity allowing for unlocking a locked engagement of the interlocking structure 110 to the female connector, i.e. socket connector 106. Such configuration allows for securing connection of the interlocking structure 110 in a locked position to the socket connector 106, for example, when the socket connector 106 is engaged with the electronic device 120. Moreover, this allows for selectively preventing removal of the security adapter 100 when engaged with the electronic device 120.

The way in which the security adapter is configured with the interlocking structure for engaging with an electronic device will be described in more detail in association with FIG. 3A, FIG. 3B and FIG. 3C.

Security adapter 100 also includes an electronic circuitry 140 that is operative, when the plug connector 104 is mounted to the host 130, to identify the security adapter 100 to the host 130. In an embodiment, with the electronic device 120 and the host 130 operatively coupled via the security adapter 100, the electronic circuitry 140 identifies the security adapter 100 to the host 130 for user and data access between the electronic device 120 and the host 130. The electronic circuitry 140 may identify the security adapter 100 to the host 130, for example, for securing access to facility and computer systems of an organization. This may be the case with the host 130 accommodating an access control application 142 running thereon for controlling user and data access operations between the host 130 and the electronic device 120 to which it is coupled, via the security adapter 100. This may also optionally be the case, for example, where the host 130 is connected to a network, to a server and/or to other computer systems of an Enterprise or other sort of organization.

For achieving this, the electronic circuitry 140 in the security adapter 100 communicates with the access control application 142 running on the host 130 to identify the security adapter 100 in front of the host 130. As shown in FIG. 1, access control application 142 may reside in the host 130 and executed directly from the host 130. Alternatively or optionally, access control application 142 may be an executable file that is loaded onto the host 130 (for example via the organization network) by using a suitable communications interface.

In general, access control application 142 may be a computer program employing computer readable program code that, when running on a host, establish rules for controlled user and data operations between the host and a connectable device. More specifically, access control application 142, when running on the host 130, interacts with the electronic circuitry 140 on the security adapter 100 for allowing controlled user and data gateway between the electronic device 120 and the host. Such controlled user and data gateway typically involve the access control application 142 controlling (e.g. restricting, conditioning, monitoring) login operations, data storage (e.g. read and write) operations and data access and data transfer in and out of the host 130 directly, among other user and data operations that are commenced between the host 130 and the electronic device 120.

For achieving this, the access control application 142 establishes a respective set of rules that are determined based on the electronic circuitry 140 identifying the security adapter 100 to the host 130. Such rules may refer, for example, to the number and type of hosts (e.g. PC) the electronic device 120 can communicate with, authorized times for communication, which operations are allowed (e.g. read file, write file, edit file, etc.) and to which type of data (e.g. secured, protected, read-only), location of the data in the memory (residing on public partition, secured partition), information transfer rate, among other possible parameters. Accordingly, the way in which the access control application 142 analyzes the data and operates to control user and data operations between the electronic device 120 and the host 130 may depend on the specific system requirements and, optionally, on the various applications running on the host 130.

In one example, the access control application 142 may comprise computer readable program code that, when running on host 130, interacts with the electronic circuitry 140 on the security adapter 100 for receiving data and commands coming in from the connectable electronic device 120. The access control application 142 then operates to analyze the type of data and/or command and required operation coming in from the electronic device 120, via the security adapter 100. Once an operation, say a data access operation, is analyzed with respect to data residing on the host 130, the required operation is handled by the access control application 142 accordingly. The access control application 142 may carry out a variety of response mechanisms for controlling user and data operations between the electronic device 120 and the host 130. This may include denying access of the electronic device 120 to the host 130; restricting the electronic device 120 access to certain types of data and/or data locations on the host 130, for example for reading or writing only certain types of files; or allowing the electronic device 120 access to data residing on the host 130, or to certain portions thereof. Such, for example, to deny the electronic device 120 access to secure data (e.g. legal documents, human resource documents) residing on the host 130. In another example, the access control application 142 may be designed to block any writes of .exe files to the host 130, or in general to block write of any data to the host 130.

Either way, once the security adapter 100 (with the electronic device 120) is engaged with the host 130 and communication between the electronic device 120 and the access control application 142 running on the host 130 is established, via the security adapter 100, the access control application 142 operates to control user and data operations between the electronic device 120 and the host 130 for securing access between the electronic device 120 and the host 130.

Such controlled user and data operations may involve aggregating and reporting on user access rights, performing access rights reviews, identifying dormant users and excessive access rights, and so on. For example, identifying unused access rights is fundamental to reducing the risk of unwarranted insider data access. Organizations can identify these states by correlating user access rights with actual data access activity by the electronic device 120. The access control application 142 may log the activity in real-time and send alerts to security personnel. For example, with the hosting computer being connected to a network of an organization the set of rules may affect the way in which data in and out of the host are transferred, stored and protected what happens when that electronic device 120 (for example in the form of a USB drive) leaves the Enterprise, among other operations providing controlled user and data management capabilities to and from the host directly. These and other operations may reduce unwarranted data access by ensuring user rights align with corporate policy. This prevents insiders such as employees, contractors, outsourcers, etc., from accessing data unless there is a business need-to-know.

Access control application 142 may reside on the host 130, or be configured, for example as an executable file, that is downloaded from a server over a network to run on the host 130. Moreover, the access control application 142 may be configured to run on the host 130 without installing or copying components of the access control application 142 into local storage components on the host 130. This increases the portability of use of the access control application 142 with several, differently owned host computers. For similar reasons, the access control application 142 preferably does not involve components requiring reboot of a host computer and/or modification of any sort on a host computer. Nevertheless, this is not meant to limit the scope of this disclosure, so that the access control application 142 may be optionally copied (loaded) onto the internal memory of a host (e.g. host 130) for actually residing on the host 130, for example on a non-volatile memory component of the host 130.

The above-described access control application 142, including its program code and application files may be (either regularly or dynamically) updated to address changing system requirements and to meet progressing system configurations in any of the means known or yet to be known in the art. For example, with the host 130 connected to a network of an organization, the access control application 142 may be updated with application files and security updates deployed on a server by employing a server update technology that is identical or similar to the Windows Server Update Services™ (WSUS) or Software Update Services™ (SUS) employed by Microsoft™ Corporation. Briefly, WSUS is a computer program developed by Microsoft™ Corporation that enables administrators to manage the distribution of updates and hotfixes (cumulative package that includes one or more files that are used to address a problem in a software program) to computers on a network in a corporate environment.

It should be noted that operation of the security adapter 100, when engaged with an electronic device and mounted into a host as described above, requires no change on the host to which it is connected to. Moreover, the way in which the access control application 142 operates and further interacts with the security adapter, as described above, may depend on the various applications running on the host and, optionally, on the specific implementation design of the access control application 142.

As already mentioned above, the access control application 142 may reside in the host 130 and executed directly from the host 130, or may be an executable file that is loaded onto the host 130 by using a suitable communications interface, such as via the hosting network. Accordingly, communication between the host 130 and the security adapter 100, and more specifically between the access control application 142 running on the host 130 and the electronic circuitry 140 in the security adapter 100, may be initiated, for example, upon mounting of the security adapter 100 with the electronic device 120 into a port in the host 130.

Figure 2:
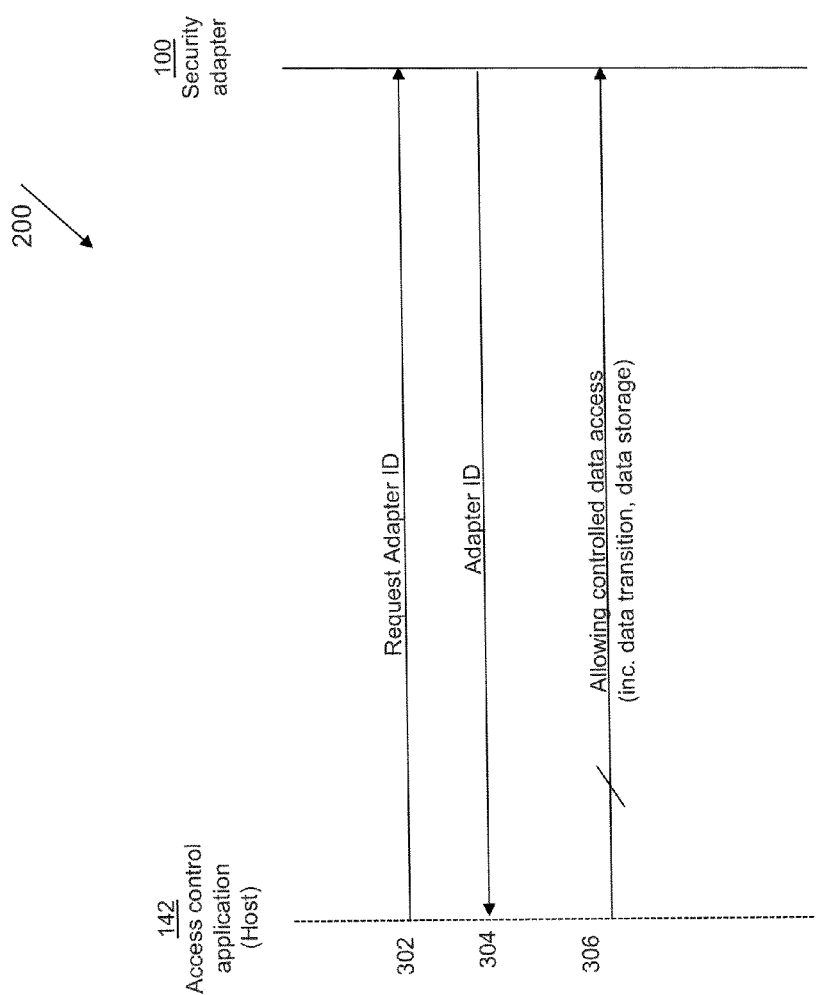
FIG. 2 illustrates a system a command flow between the security adapter and a connectable host, according to an example.

FIG. 2 illustrates a command exchange 200 between the access control application 142 on the host 130 and the security adapter 100, according to one embodiment. FIG. 2 will be described in conjunction with FIG. 1, where the security adapter 100 is configured with two connectors that include a male connector and a female connector, one on each side of the body 102. The male connector, i.e. plug connector 104, is for engaging with the host 130 and the female connector, i.e. socket connector 106, is for engaging with the electronic device 120. A particular implementation of FIG. 3 includes the access control application 142 running on the host 130 for securing access to facility and computer systems of an organization.

A user inserts the security adapter 100 (with the electronic device 120) into the host connector 132 of the host 130 to begin use of the electronic device 120. The insertion of the security adapter 100 into the host 130 prompts drivers or components of the host operating system to establish communication between the security adapter 100 and the access control application 142 running on the host 130.

In an embodiment, communication between the access control application 142 and the security adapter 100 (and the electronic device 120) involves an authentication session for verifying the authenticity of the electronic device's 120 resident applications and stored content to ensure that the host 130, and, optionally, other computer systems of the associated Enterprise hosting network, are eligible to receive (e.g. protected) data that are stored on the electronic device 120, via the security adapter 100. For example, this may be applicable for preventing a malicious application residing on the electronic device 120 (e.g. on the USB drive) from copying, or even uploading itself onto the connectable host, so that to ensure the organization's information systems remain secure.

Optionally, communication between the host 130 and the security adapter 100 may be performed over a secure channel. The secure channel may be established, for example, by the access control application 142 employing a key-exchange mechanism that is identical or similar to the key-exchange mechanism employed by IEEE 1667 Authentication Silo. Briefly, IEEE 1667 ("Standard Protocol for Authentication in Host Attachments of Transient Storage Devices") is a standard that describes a method for authenticating storage devices such as USB flash drives when they are interfaced with a computer.

Either way, once a communication channel is established between the security adapter 100 and the access control application 142 on the host 130, the access control application 142 triggers an "identification process", in which the security adapter 100 is identified in front of the access control application 142 running on the host 130. More specifically, mounting the security adapter 100 into the host 130 invokes the access control application 142 running on the host 130 to issue a request, at 302, for receiving the security adapter identification number (ID). This prompts the electronic circuitry 140 of the security adapter 100 to transmit, at 304, the security adapter ID to the access control application 142 for identifying the security adapter 100 to the host 130. The security adapter ID may be in the form of a unique serial number that respectively identifies the security adapter in front of the host 130.

Following this, the access control application 142 operates to allow controlled user and data access operations between the host 130 and the electronic device 120, via the security adapter 100. Such controlled user and data access operations involve controlled data transfer and data storage (read, write) operations, shown at 306. In an example, if a command coming in from the electronic device 120 includes a request to conduct an operation that is not allowed, the access control application 142 will deny performing the operation and may issue an alert signal to the security personnel of the Enterprise.

The controlled data access performed by the access control application, per the command transfer shown at 306, may be repeated multiple times, for example, each time for allowing controlled user and data access to and from a different data location on the host 130 and/or the electronic device 120. With the access control application 142 determining that a UFD and/or data access command is not authorized to perform the associated operation (such as to access a requested data location) on the host 130, the access control application 142 may indicate the host 130 and/or the user accordingly.

It should be noted that the command flow described herein above with respect to FIG. 2 is an example only that is not meant to limit the scope of this disclosure, so that various modifications, variations, alterations, situations, and equivalents can be apparent and any activity can be repeated and any activity can be performed by multiple entities. For example, the authentication process is an optional process that may be initiated by the access control application 142 host 130 and typically meant to provide a higher level of assurance in communication between the host 130 and the electronic device 120. Such authentication can also be performed as (an integral) part of the "identification process" (at 302), e.g., upon insertion of the security adapter 100 into a port in the host 130. Moreover, the way in which the access control application 142 running on the host 130 operates and further interacts with the electronic circuitry 140 when connected to the security adapter 100 may depend on the specific implementation design of the access control application 142 and, optionally, on the various applications running on the host 130.

As can be seen, such command flow provides for the access control application 142, when running on the host 130, to interact with the electronic device 120, via the security adapter 100, for controlling user and data access, thereby for securing user and data access to the host 130, in particular, and to the facility of and other networked computer systems within the host's 130 organization, in general.

Figure 3A:
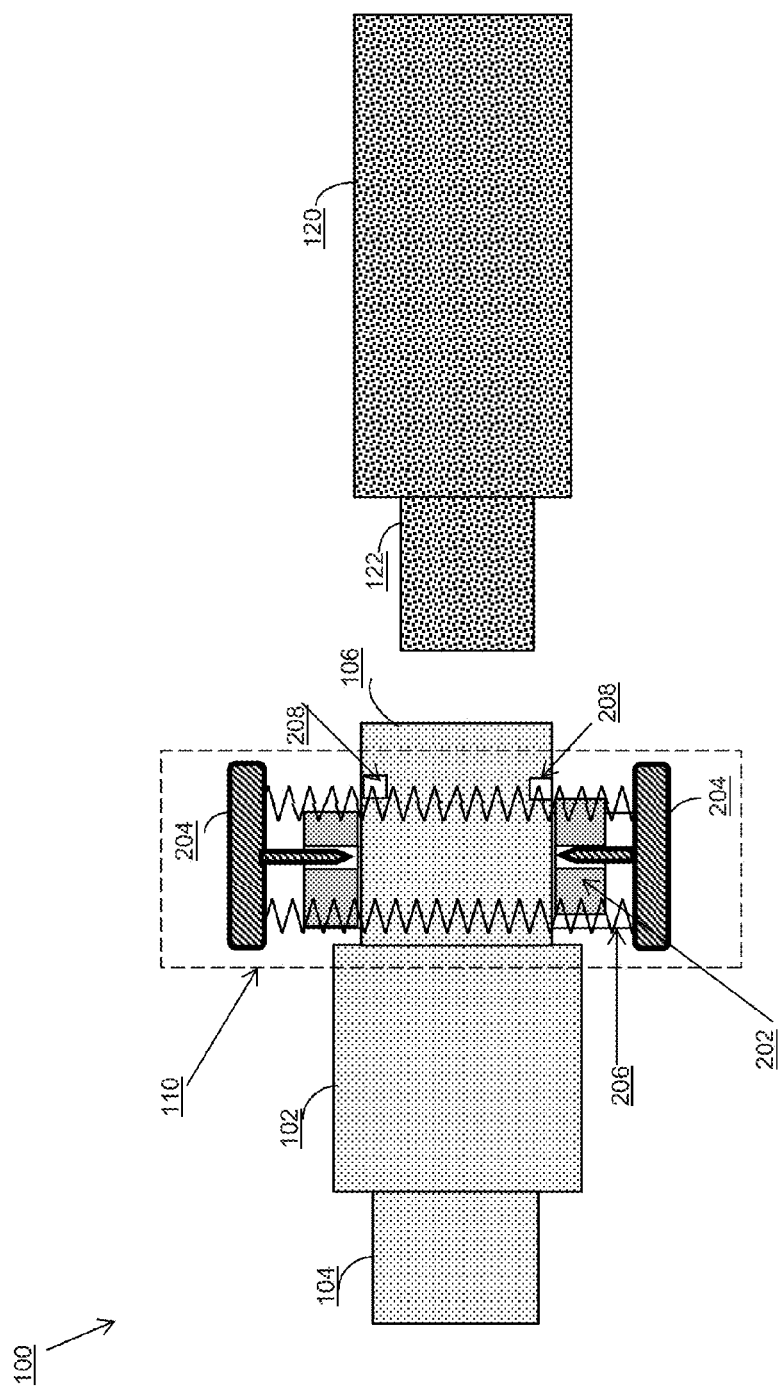
FIG. 3A is a cross-sectional view of the security adapter for engaging with an electrical device, according to an embodiment.

FIG. 3A is a cross-sectional view of the security adapter 100 for engaging with an electronic device, according to an embodiment. FIG. 3A will be described in conjunction with FIG. 1, where the security adapter 100 is associated with the socket connector 106 and configured with the interlocking structure 110 for locking the socket connector 106 to a connectable electronic device, typically in the form of a USB flash drive or other mass storage means.

As already mentioned above, the interlocking structure 110 is configured to have first and second positions, so that in the first position (shown as "A" in FIG. 3B) the interlocking structure 110 locks an unlocked engagement of the electronic device 120 to the socket connector 106 to which it is engaged with. In the second position (shown as "B" in FIG. 3C) the interlocking structure 110 unlocks a locked engagement of the electronic device 120 from the socket connector 106, thereby allowing removal of the electronic device 120 from the security adapter 100.

In an embodiment, interlocking structure 110 includes a slidable element 202 with latches 204 and an elastic member, such as in form of springs 206. The slidable element 202 can be designed in any shape suitable to allow latches and to allow bringing the interlocking structure 110 to the first position (shown as "A" in FIG. 3B) and second position (shown as "B" in FIG. 3C) upon the socket connector 106. In an embodiment, the slidable element 202 is a lever, button or dial coupled to the socket connector 106, for example on each sides of the socket connector 106.

In a typically implementation, the latches 204 are provided for mechanically locking the slidable element 202 in a fixed positioning (i.e. in the first position, shown as "A" in FIG. 3B) upon the socket connector 106. For achieving this, the latches 204 are designed in a way that fit into corresponding latch receptacles 208 in the interlocking structure 110. Per FIG. 3A, the latches 204 in the interlocking structure 110 are designed on either sides of the socket connector 106. As such, when the socket connector 106 is fully connected to the device connector 122 (shown as "A" in FIG. 3B.), the latches 204 lock the device connector 106 from either sides of the device connector 106 by penetrating into the socket connector 106 through latch receptacles 208.

The springs 206 are typically attached to the latches 204; namely, to the internal surfaces of the latches 204 that face the socket connector 106 in a manner that connects between the latches 204 on each side of the socket connector 106. The springs 206 may be flexed out in the direction external to the socket connector 106 to enable widening the gap between the latches 204 and extracting the latches 204 from their positioning within latch receptacles 208. With the springs 206 flexing outwardly as indicated by arrows 404, the interlocking structure 110 is free to move about socket connector 106.

FIG. 3B is a cross-sectional view of the security adapter 100 with the interlocking structure 110 being in a locked position and engaged with an electrical device, according to one embodiment. FIG. 3B will be described in conjunction with FIG. 3A. In the locked position, shown as "A" in FIG. 3B, the latches 204 are positioned within the latch receptacles 208 to mechanically constrain removal of the device connector 122 from the socket connector 106. The positioning of the latches 204 within the latch receptacles 208 prevent movement of the springs 206 upon the interlocking structure 110 without using an external tool. That is, positioning of the latches 204 within the latch receptacles 208 prevent the springs 206 from flexing outwardly, such that the springs 206 are flexed inwardly in the direction indicated by arrows 402. Accordingly, the socket connector 106 mounted to the electronic device 120 is secured under a modest resistance. As long as the interlocking structure 110 remains in a locked position, the security adapter 100 is engaged to the electronic device 120 and cannot be removed by an unauthorized user.

FIG. 3B is a cross-sectional view of the security adapter 100 with the interlocking structure 110 being in a locked position and engaged with an electrical device, according to one embodiment. FIG. 3C will be described in conjunction with FIG. 3A. In the unlocked position, shown as "B" in FIG. 3C, the latches 204 extend outward and away from the latch receptacles 208 with which they are aligned, so that the springs 206 are free to flex outwardly in the direction indicated by arrows 404. Accordingly, the gap between the latches 204 on each side of the socket connector 106 is sufficient for the springs 206 to flex outwardly, such that the latches 204 are pushed out of the latch receptacles 208. As shown in FIG. 3C, the latches 204 are pushed out far enough in order to allow the interlocking structure to move about the socket connector 106; namely, from position "A" to position "B".

It should be noted that the interlocking structure 110 including the slidable element 202 is not necessarily so restricted in its configuration with the latches 204 and springs 206, in that, e.g., the slidable element with latches must be designed on each side of the socket connector 106, or if the slidable element are designed on each side of the socket connector that these sides are opposite each other, that the springs are parallel to each other, located in any other configuration relative to each other, or that any of the elements are restricted in any other way. Such, for example, the interlocking structure 110 may be held in a locked position in various ways, such as friction or designing the interlocking structure 110 with the slidable element 202 to move slightly beyond the first position (relative to pushback force of the springs 206 against latches in the interlocking structure 110) before the latches are brought to a fixed positioning upon the socket connector 106.

Returning to FIG. 3A, the security adapter 100 with socket connector 106 and interlocking structure 110 is capable of engaging with the electronic device 120 in such a way that the interlocking structure 110 locks an unlocked engagement of the interlocking structure 110 to the socket connector 106 to which it is engaged with for locking the electronic device 120 to such connector.

In an embodiment, the interlocking structure 110 is operable in the first position (shown as "A" in FIG. 3B) upon mounting the security adapter 100 to an electronic device, such that the socket connector 106 is engaged with a device connector of the electronic device. In a typical implementation, the interlocking structure 110 is operable to transition from the first position (shown as "A") to the second position (shown as "B" in FIG. 3C) contingent on external means. In such case, removal of the security adapter 100 from the electronic device 120 may be achieved by utilizing special means or mechanism, such as in the form of a special tool applying a mechanical force that allow for extracting the latches 204 from within their positioning in latch receptacles 208.

In one example, the special tool, when utilized with the security adapter 100, applies mechanical forces, such as in the form of a magnetic force, on the interlocking structure 110. More specifically, the magnetic force is applied on the latches 204 when the socket connector 106 is engaged with the electronic device 120 and the latches 204 are fixed within the corresponding latch receptacles 208 in the socket connector 106. As a result of the magnetic force applied on the latches 204, the latches 204 are extracted from their positioning within latch receptacles 208. This allows for the slidable element 202 in the interlocking structure 110 to move about the socket connector 106, thereby bringing the interlocking structure 110 to its second position (shown as the second position "B" in FIG. 3C) to unlock the locked engagement of the electronic device 120 to the socket connector 106.

In another example, the special means may be a mechanical or an electric lock that requires an authorized password, or other sort of secure information that the user using the security adapter with his/her electronic device does not possess. Again, this tool may be operable contingent on an authorized password to allow for the interlocking structure 110 to transition from the first position (shown as "A") to the second position (shown as "B" in FIG. 3C) upon the socket connector 106.

Moreover, the interlocking structure 110 is operable to transition from the first position (shown as "A") to the second position (shown as "B" in FIG. 3C) contingent on external means, which means are typically of, or associated with an authorized entity for unlocking a locked engagement of the interlocking structure 110 to the socket connector 106 in the security adapter 100. For example, with the security adapter 100 provided for securing access to facility and computer systems of an organization, the removal process may be performed by an authorized user, such as the IT (Information Technology) person or security officer in the organization. The authorized user may utilize the special tool with the security adapter 100 for removing the security adapter 100 from the electronic device 120 when the socket connector 106 is engaged with the electronic device 120.

The above-disclosed configuration allows bringing the interlocking structure 110 in the security adapter 100 to a locked position upon the socket connector 106 for locking the electronic device 120 to the socket connector 106 when the socket connector 106 is engaged with the electronic device 120, but also provides for releasing the interlocking structure 110 from its locked state upon the socket connector 106 to thereby enable removal of the socket connector 106 from the electronic device 120. It is appreciated that typically as long as the interlocking structure remains in its locked position upon the socket connector 106, the slidable element 202 with the latches 204 and springs 206 function to effectively constrain movement of the interlocking structure 110 about the socket connector 106; that is to an unlocked position, and not to allow disengaging of the security adapter 100 from a connectable electronic device without the use of a special tool.

It is also appreciated that the security adapter exemplified herein with reference to security adapter 100 can have any shape, size, configuration, orientation, etc., and can consist of any kind of slidable element, latching means, interlocking structure, electronic circuitry, etc. It is further appreciated that embodiments of this disclosure may be practiced with functionality, exemplified herein with reference to interlocking structure 110, slidable element 202, latches 204, and springs 206, wherein the listed elements are positioned, configured, oriented, etc., in such a way that the location of all or any of these elements is not limited in any way and provided herein as an example only.

What is claimed is:

1. A security adapter for an electronic device, the security adapter comprising:
   a device receptacle that is configured to engage a connector of an electronic device;
   a host connector that is configured to engage a receptacle of a host; and
   an interlocking structure associated with the device receptacle, wherein the interlocking structure is configurable to have a locked configuration and wherein the interlocking structure is configurable to have an unlocked configuration, wherein, when the device receptacle is coupled to the electronic device:
      in the locked configuration, the interlocking structure locks the device receptacle to the electronic device, and
      in the unlocked configuration, the interlocking structure unlocks the device receptacle from the electronic device, wherein the interlocking structure is configured to switch from the locked configuration to the unlocked configuration responsive to a plurality of buttons.

2. The security adapter of claim 1, wherein the device receptacle and the host connector are configured to enable the host to access a memory of the electronic device when the electronic device is coupled to the device receptacle and the host connector is coupled to the receptacle of the host.

3. The security adapter of claim 1, wherein the locked configuration corresponds to a first position of the interlocking structure and wherein, in the first position, the interlocking structure locks the device receptacle to the connector of the electronic device.

4. The security adapter of claim 1, wherein the device receptacle and the host connector are respectively located on different sides of the security adapter.

5. The security adapter of claim 4, wherein the different sides are opposite sides.

6. The security adapter of claim 1, wherein the device receptacle is a Universal Serial Bus (USB) receptacle, and the host connector is a USB connector.

7. The security adapter of claim 1, wherein the locked configuration corresponds to a first position of the interlocking structure and wherein the interlocking structure includes a slidable element with latches that mechanically lock the slidable element in the first position.

8. The security adapter of claim 1, wherein the security adapter further comprises:
   electronic circuitry configured to, when the host connector is coupled to the receptacle of the host, provide information to an access control application of the host, the information enabling the access control application to establish rules to control communication between the host and the electronic device.

9. The security adapter of claim 8, wherein, the electronic circuitry is configured to interact with the host, when the host connector is coupled to the receptacle of the host and the connector of the electronic device is coupled to the device receptacle, to control user and data access between the electronic device and the host.

10. The security adapter of claim 1, wherein the electronic device is a storage device.

11. The security adapter of claim 8, wherein the rules restrict access by the electronic device to data of the host, restrict the electronic device to reading or writing particular types of data, restrict execution of executable files received by the host from the electronic device, or a combination thereof.

12. A method comprising:
   at a security adapter that includes a body, a device receptacle, a host connector, and an interlocking structure associated with the device receptacle, wherein the interlocking structure is configurable to have a locked configuration, wherein the interlocking structure is configurable to have an unlocked configuration, and wherein the host connector is capable of engaging with a receptacle of a host and the device receptacle is capable of engaging with a connector of an electronic device, when the security adapter is engaged with the electronic device, performing by the interlocking structure:
  locking the electronic device to the device receptacle in the locked configuration, and
  unlocking the electronic device from the device receptacle in the unlocked configuration, wherein the interlocking structure is configured to switch from the locked configuration to the unlocked configuration responsive to a plurality of buttons.

13. The method of claim 12, wherein locking the electronic device to the device receptacle secures the connector of the electronic device to the device receptacle.

14. The method of claim 12, wherein the device receptacle is a Universal Serial Bus (USB) receptacle, and the host connector is a USB connector.

15. The method of claim 12, wherein the device receptacle and the host connector are respectively located on different sides of the security adapter.

16. The method of claim 15, wherein the different sides are opposite sides.

17. The method of claim 12, wherein the security adapter further includes electronic circuitry configured to, when the host connector is coupled to the receptacle of the host, provide information to an access control application of the host, the information enabling the access control application to establish rules to control communication between the host and the electronic device.

18. The method of claim 17, wherein the security adapter is further configured to, when the host connector is coupled to the receptacle of the host, perform key exchange with the host to establish a communication channel, wherein the information includes an identifier of the security adapter, and wherein the identifier is provided to the access control application after the communication channel is established.

19. The method of claim 17, wherein the rules to control communication between the host and the electronic device include rules to identify unused access rights by correlating user access rights with data access activity by the electronic device.

20. The method of claim 17, wherein controlling communication includes verifying applications, data, or both, stored on the electronic device.

21. The method of claim 12, wherein the electronic device is a storage device.

22. The method of claim 12, wherein the interlocking structure is operable in a first position upon mounting the security adapter to the electronic device, the first position corresponding to the locked configuration.

23. The method of claim 12, wherein the interlocking structure is operable to transition from the locked configuration to the unlocked configuration contingent on utilization of an external tool of an authorized entity for unlocking the electronic device from the device receptacle.

* * * * *